US012776510B2

(12) United States Patent
Vereecken et al.

(10) Patent No.: US 12,776,510 B2
(45) Date of Patent: Oct. 27, 2026

(54) ELECTROCHEMICAL PROCESS FOR FORMING A SOLID ELECTROLYTE

(71) Applicants: IMEC VZW, Leuven (BE); Katholieke Universiteit Leuven, Leuven (BE)

(72) Inventors: Philippe Vereecken, Hoegaarden (BE); Sebastiaan Herregods, Edegem (BE); Genis Vanheusden, Leuven (BE); Fanny Barde, Holsbeek (BE)

(73) Assignee: Imec VZW, Leuven (BE)

( * ) Notice: Subject to any disclaimer, the term of this patent is extended or adjusted under 35 U.S.C. 154(b) by 786 days.

(21) Appl. No.: 18/246,786

(22) PCT Filed: Aug. 31, 2021

(86) PCT No.: PCT/EP2021/074060
§ 371 (c)(1),
(2) Date: Mar. 27, 2023

(87) PCT Pub. No.: WO2022/063531
PCT Pub. Date: Mar. 31, 2022

(65) Prior Publication Data

US 2023/0411677 A1 Dec. 21, 2023

(30) Foreign Application Priority Data

Sep. 28, 2020 (EP) .................................... 20198679

(51) Int. Cl.
*H01M 10/056* (2010.01)
*H01M 10/058* (2010.01)

(52) U.S. Cl.
CPC ....... *H01M 10/056* (2013.01); *H01M 10/058* (2013.01); *H01M 2300/0085* (2013.01)

(58) Field of Classification Search
None
See application file for complete search history.

(56) References Cited

U.S. PATENT DOCUMENTS 9,911,981 B1 3/2018 Kane
2004/0146785 A1* 7/2004 Mizutani ............... H01M 10/44
29/623.3

(Continued)

FOREIGN PATENT DOCUMENTS

CN 102566195 B 12/2014
EP 0488703 A1 * 6/1992 ............. C25D 13/00

(Continued)

OTHER PUBLICATIONS

PCT International Search Report and Written Opinion, Application No. PCT/EP2021/074060, mailed Nov. 25, 2021, 11 pages.

(Continued)

*Primary Examiner* — Kevin M Bernatz
(74) *Attorney, Agent, or Firm* — McDonnell Boehnen Hulbery & Berghoff LLP

(57) ABSTRACT

A method for forming a solid electrolyte coating on a substrate (1), the method comprising: a. providing a first and a second electrode (3), b. coating a sol-gel precursor solution (4) of the solid electrolyte coating on the substrate (1) and electrically contacting the sol-gel precursor solution (4) with the first and the second electrode, the sol-gel precursor solution (4) being capable of forming a gel in presence of a voltage, and c. generating the voltage across the sol-gel precursor solution (4) via the first and the second electrodes, thereby transforming the sol-gel precursor solution (4) into a gel.

20 Claims, 4 Drawing Sheets

(56) References Cited

U.S. PATENT DOCUMENTS

| | | | | |
|---|---|---|---|---|
| 2009/0090634 | A1 | 4/2009 | Radatz et al. | |
| 2011/0031125 | A1* | 2/2011 | Heinrichsdorff ....... | C25D 15/00<br>977/773 |
| 2013/0112563 | A1 | 5/2013 | Tomantschger et al. | |
| 2020/0006807 | A1* | 1/2020 | Chen ................. | H01M 10/0562 |
| 2020/0112050 | A1* | 4/2020 | Hu ...................... | H01M 10/056 |

FOREIGN PATENT DOCUMENTS

| | | | | |
|---|---|---|---|---|
| EP | 3043406 | A1 | 7/2016 | |
| EP | 3706143 | A1 * | 9/2020 | ............... H01B 1/06 |
| KR | 20200034286 | A | 3/2020 | |
| WO | 20080038293 | A2 | 4/2008 | |
| WO | WO-2008038293 | A2 * | 4/2008 | ............... C25D 9/06 |
| WO | 20160074113 | A1 | 5/2016 | |
| WO | 2019016036 | A1 | 1/2019 | |

OTHER PUBLICATIONS

Manov, M., and T. Kalinov. “Augmentation of ship’s operational availability through innovative reconditioning technologies.” In Journal of Physics: Conference Series, vol. 1297, No. 1, p. 012002. IOP Publishing, 2019.

* cited by examiner

ELECTROCHEMICAL PROCESS FOR FORMING A SOLID ELECTROLYTE

TECHNICAL FIELD OF THE INVENTION

The present invention relates to a method for forming a solid electrolyte, to a method for forming a composite electrode comprising the solid electrolyte, and to a method for forming a solid-state battery comprising the composite electrode.

BACKGROUND OF THE INVENTION

The function of any electrolyte in a lithium-ion (Li-ion) battery is to allow the flow of Li-ions between the two electrodes (the + and − side) to enable the charging and discharging of the battery. In current generations of Li-ion batteries, solvent-based liquid electrolytes are used, typically consisting of organic carbonates such as mixtures of ethylene carbonate and dimethyl carbonate with a dissolved Li-salt such as $LiPF_6$. While these liquid electrolytes offer high ionic conductivities, which is necessary for the required flow of Li-ions, the use of flammable organic carbonate solvents causes considerable safety risks in batteries, as demonstrated by recent media coverage of exploding smartphone batteries. Such safety issues are especially concerning when upscaling the batteries for the use in electric vehicles, where large battery packs fill the bottom of the cars. Additionally, side-reactions between the electrolyte and electrode prevent the use of higher capacity electrode materials such as metallic lithium or high voltage cathode materials and also cause loss of capacity in existing battery systems.

By replacing these liquid electrolytes with, inert, solid electrolytes, solid-state batteries are expected to have inherently increased safety and energy density. In particular, the development of solid-state Li-ion batteries is a highly desired goal in the battery field. This development requires novel high-performance solid electrolyte materials to be developed and implemented in battery systems. In particular composite electrolytes, a type of solid electrolyte, can have particularly high ion mobility (EP3043406, and Chen et al., Science Advances 6 (2020) eaav3400). The composite electrolyte may for instance comprise a porous matrix comprising a plurality of interconnected pores. As an example, according to theory, a first layer comprising a first material, e.g. a polymer or an ionic liquid, may cover inner surfaces of the pores. An electrolyte compound, in turn, may cover the first layer, hence forming a second layer. Due to a combination of specific interactions between the matrix material, the first layer, and the second layer, an ion of the electrolyte compound e.g. lithium, is relatively free to move through the pores, thereby being able to move fast between the electrodes. In some experiments on composite electrolytes, the mobility of the ion of the electrolyte compound through the pores was shown to be higher than the mobility of the ion in the bulk electrolyte compound.

Some types of solid electrolytes, in particular the composite electrolytes, are made from a sol-gel process. The materials utilized in this sol-gel process are prepared starting from a precursor liquid: following a solidification step, they obtain monolithic solid structures. An important advantage is that the precursor liquid can be impregnated into porous electrodes, thereby allowing the complete filling of the pores, followed by solidification via the sol-gel process, thereby forming a composite electrode that can be integrated into a solid-state battery. This liquid-to-solid approach using liquid impregnation, gelation, and solidification is compatible with the battery manufacturing process used for current liquid electrolyte-based Li-ion batteries.

A disadvantage is that the gelation step can take several days to complete. This makes the materials ill-suited for practical integration into processes for manufacturing solid-state batteries due to the long curing times involved, which can take e.g. 5-7 days. Application of the precursor liquid is for example not straightforward in a sheet-to-sheet or roll-to-roll process, as the low viscosity precursor liquid flows from the foils. Spill-over of the low viscosity precursor results in loss, and hence non-optimized, usage of the materials, thereby increasing the manufacturing costs. Besides, such long curing times have a negative impact on the manufacturing costs. Finally, this method is not well-suited to produce thin layers of the solid electrolyte. In order to circumvent these problems, methods are required to trigger the start of the gelation of the solid electrolyte and have fast gelation.

SUMMARY OF THE INVENTION

It is an object of the present invention to provide good methods for forming solid electrolytes. It is an advantage of the present invention that it provides good methods for forming composite electrolytes.

It is an advantage of embodiments of the present invention that the techniques utilized in the method do not require expensive materials and/or techniques.

It is an advantage of embodiments of the present invention that they allow the very fast formation of the solid electrolyte. It is an advantage of embodiments of the present invention that they allow the very fast formation of the composite electrolyte. It is an advantage of embodiments of the present invention that a solid electrolyte formed has an ion mobility comparable to that of a solid electrolyte formed with a conventional, much slower technique. It is an advantage of embodiments of the present invention that a composite electrolyte formed has an ion mobility comparable to that of a composite electrolyte formed with a conventional, much slower technique.

It is an advantage of embodiments of the present invention that the solid electrolyte may be formed on a conductive substrate. It is an advantage of embodiments of the present invention that the conductive substrate may function as an electrode of the solid-state battery comprising the solid electrolyte on the conductive substrate.

It is an advantage of embodiments of the present invention that it allows the very fast formation of a composite electrode comprising the solid electrolyte, such as the composite electrolyte. It is an advantage of embodiments of the present invention that the method facilitates the practical integration of the composite electrode material in solid-state batteries.

It is an advantage of embodiments of the present invention that they result in practical and upscalable methods for the integration of the materials in solid-state batteries. It is an advantage of embodiments of the present invention that gelification is highly controlled, as it is primarily catalysed in the region close to the surface of the electrodes. It is an advantage of embodiments of the present invention that material and time is saved in the manufacturing of the solid electrolyte, thereby reducing the manufacturing costs. It is an advantage of embodiments of the present invention that they may incorporate a blade or a slot-die, rendering the method compatible with roll-to-roll and sheet-to-sheet manufacturing of solid electrolytes. Furthermore, in embodiments, e.g. a vertically or inclined oriented roll-to-roll of sheet-to-sheet manufacturing technique may be used which advantageously saves space, thereby saving manufacturing costs. It is an advantage of embodiments of the present invention that by tuning of parameters such as electrochemical parameters, deposition time of precursor solution, and precursor solution parameters, the thickness of the formed solid electrolyte may be controlled. It is an advantage of embodiments of the present invention that solid electrolytes and composite electrodes can be formed with a flat top surface, hence facilitating contacting with any additional layers, thereby facilitating integration in solid-state batteries.

The above objective is accomplished by a method and device according to the present invention.

According to a first aspect, the present invention relates to a method for forming a solid electrolyte coating on a substrate, the method comprising: (a) providing a first and a second electrode, (b) coating a sol-gel precursor solution of the solid electrolyte coating on the substrate and electrically contacting the sol-gel precursor solution with the first and the second electrodes, the sol-gel precursor solution being capable of forming a gel in presence of a voltage, (c) generating the voltage across the solution via the first and the second electrodes, thereby transforming the sol-gel precursor solution into a gel; and optionally (d) drying or baking the gel.

According to a second aspect, the present invention relates to a process for forming a composite electrode, the process comprising performing a method according to the first aspect of this invention, wherein the substrate is a conductive substrate and comprises a porous active electrode material and wherein step b results in impregnating the porous active electrode material with the sol-gel precursor solution.

According to a third aspect, the present invention relates to a method for forming a solid-state battery comprising the steps of (i) forming a composite cathode electrode by a process according to the second aspect of the present invention, (ii) forming a solid electrolyte material on a conductive substrate by a method according to the first aspect of this invention, and (iii) physically contacting the solid electrolyte material of the composite cathode electrode formed in step (i) with the solid electrolyte material coating present on the conductive substrate formed in step (ii).

Particular and preferred aspects of the invention are set out in the accompanying independent and dependent claims. Features from the dependent claims may be combined with features of the independent claims and with features of other dependent claims as appropriate and not merely as explicitly set out in the claims.

Although there has been constant improvement, change, and evolution of devices in this field, the present concepts are believed to represent substantial new and novel improvements, including departures from prior practices, resulting in the provision of more efficient, stable, and reliable devices of this nature.

The above and other characteristics, features, and advantages of the present invention will become apparent from the following detailed description, taken in conjunction with the accompanying drawings, which illustrate, by way of example, the principles of the invention. This description is given for the sake of example only, without limiting the scope of the invention. The reference figures quoted below refer to the attached drawings.

Figure 1:
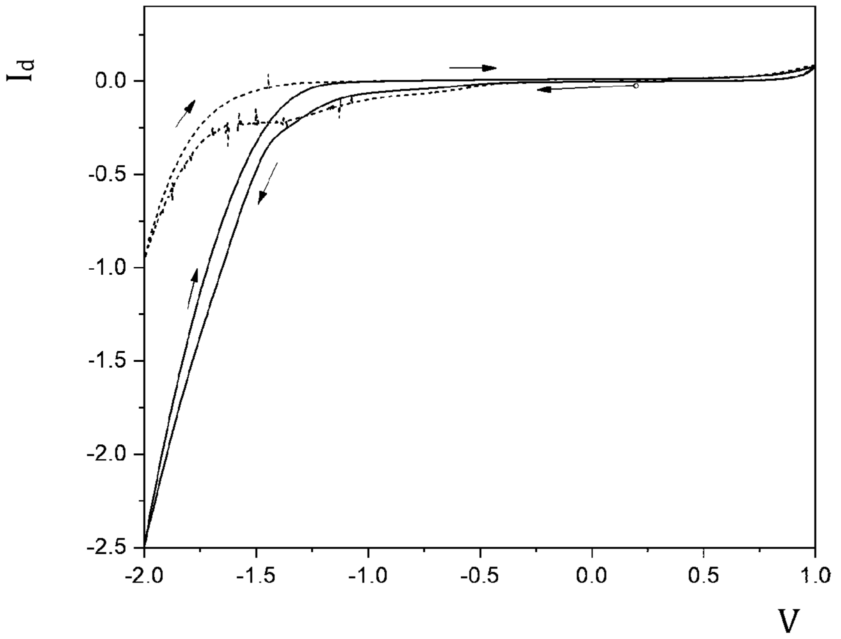
FIG. 1 is a plot which results from a cyclic voltammetry experiment performed on an aged sol-gel precursor solution.

In the different figures, the same reference signs refer to the same or analogous elements.

DESCRIPTION OF ILLUSTRATIVE EMBODIMENTS

The present invention will be described with respect to particular embodiments and with reference to certain drawings but the invention is not limited thereto but only by the claims. The drawings described are only schematic and are non-limiting. In the drawings, the size of some of the elements may be exaggerated and not drawn on scale for illustrative purposes. The dimensions and the relative dimensions do not correspond to actual reductions to practice of the invention.

Furthermore, the terms first, second, third and the like in the description and in the claims, are used for distinguishing between similar elements and not necessarily for describing a sequence, either temporally, spatially, in ranking or in any other manner. It is to be understood that the terms so used are interchangeable under appropriate circumstances and that the embodiments of the invention described herein are capable of operation in other sequences than described or illustrated herein.

Moreover, the terms top, bottom, over, under and the like in the description and the claims are used for descriptive purposes and not necessarily for describing relative positions. It is to be understood that the terms so used are interchangeable under appropriate circumstances and that the embodiments of the invention described herein are capable of operation in other orientations than described or illustrated herein.

It is to be noticed that the term “comprising”, used in the claims, should not be interpreted as being restricted to the means listed thereafter; it does not exclude other elements or steps. It is thus to be interpreted as specifying the presence of the stated features, integers, steps or components as referred to, but does not preclude the presence or addition of one or more other features, integers, steps or components, or groups thereof. The term “comprising” therefore covers the situation where only the stated features are present and the situation where these features and one or more other features are present. The word "comprising" according to the invention therefore also includes as one embodiment that no further components are present. Thus, the scope of the expression "a device comprising means A and B" should not be interpreted as being limited to devices consisting only of components A and B. It means that with respect to the present invention, the only relevant components of the device are A and B.

Reference throughout this specification to "one embodiment" or "an embodiment" means that a particular feature, structure or characteristic described in connection with the embodiment is included in at least one embodiment of the present invention. Thus, appearances of the phrases "in one embodiment" or "in an embodiment" in various places throughout this specification are not necessarily all referring to the same embodiment, but may. Furthermore, the particular features, structures or characteristics may be combined in any suitable manner, as would be apparent to one of ordinary skill in the art from this disclosure, in one or more embodiments.

Similarly it should be appreciated that in the description of exemplary embodiments of the invention, various features of the invention are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the detailed description are hereby expressly incorporated into this detailed description, with each claim standing on its own as a separate embodiment of this invention.

Furthermore, while some embodiments described herein include some but not other features included in other embodiments, combinations of features of different embodiments are meant to be within the scope of the invention, and form different embodiments, as would be understood by those in the art. For example, in the following claims, any of the claimed embodiments can be used in any combination.

In the description provided herein, numerous specific details are set forth. However, it is understood that embodiments of the invention may be practiced without these specific details. In other instances, well-known methods, structures and techniques have not been shown in detail in order not to obscure an understanding of this description.

The following terms are provided solely to aid in the understanding of the invention.

The term "solid electrolyte" used in embodiments of the present invention, may refer to a substantially solid, such as a solid, material comprising an electrolyte. The solid electrolyte may be a solid material with a nonzero ion mobility, preferably a high ion mobility. Possibly, the solid electrolyte has a low electrical conductivity, preferably a negligible electronic conductivity, such as $<10^{-6}$ S/cm, preferably $<10^{-14}$ S/cm, for instance at 25° C.

The term "composite electrolyte" used in embodiments of the present invention, may refer to a material comprising a porous material i.e. a porous matrix having a plurality of pores, wherein a first material e.g. a template material, such as an ionic liquid or a polymer or a polymerized ionic liquid, or combinations thereof, and an electrolyte compound cover inner surfaces of the pores. The material of the porous matrix may comprise an electrically insulating material such as a dielectric material. The plurality of pores may be interconnected, thereby allowing the movement of ions through the pores e.g. from one side of the porous material to the other side of the porous material. The composite electrolyte may have an ion mobility, such as a high ion mobility, for instance at least $10^{-5}$ S/cm, such as at least $10^{-4}$ S/cm, e.g. $10^{-2}$ to $10^{-4}$ S/cm, the ion mobility referring to the mobility of an ion of the electrolyte compound for instance at 25° C. The ion mobility may be comparable to or higher than the mobility of the ion in the bulk electrolyte, the bulk electrolyte comprising the electrolyte compound not comprised in the composite electrolyte. The ion with high mobility may be a cation of the electrolyte compound, e.g. lithium. The composite electrolyte may have a low electrical conductivity.

According to a first aspect, the present invention is related to a method for forming a solid electrolyte coating on a substrate, the method comprising: (a) providing a first and a second electrode, (b) coating a sol-gel precursor solution of the solid electrolyte coating on the substrate and electrically contacting the sol-gel precursor solution with the first and the second electrode, the sol-gel precursor solution being capable of forming a gel in presence of a voltage, (c) generating the voltage across the sol-gel precursor solution via the first and the second electrodes, thereby transforming the sol-gel precursor solution into a gel; and optionally (d) drying or baking the gel.

The sol-gel precursor solution is a solution capable of forming a gel in the presence of a voltage, that is via a sol-gel reaction. In embodiments, the sol-gel reaction comprises polycondensation of a compound comprised in the sol-gel precursor solution. Without being bound by theory, generating the voltage across the sol-gel precursor solution in embodiments result in the formation of a catalyst, which catalyses the sol-gel reaction. This sol-gel reaction transforms the sol-gel precursor solution into the gel.

In embodiments, the sol-gel precursor solution comprises a ligand, such as a citrate, a salt to which the ligand can bind, and a solvent: in embodiments, such a sol-gel precursor, after the sol-gel reaction and the baking, yields an inorganic solid electrolyte. In embodiments, the baking comprises removing the ligands e.g. by calcination. In embodiments, the baking may comprise a heating step of heating the gel to a temperature suitable for calcining the ligand, wherein the temperature depends on the ligand. In embodiments, the temperature may be at least 200° C., such as at least 300° C., such as at least 600° C. The heating step may last for at least 1 minute, such as approximately 2 minutes. In embodiments, the baking comprises multiple heating steps, wherein, in embodiments, each subsequent heating step is at a higher temperature than the previous heating step. In embodiments, an atmosphere of the baking step may comprise or substantially consist of nitrogen. In embodiments, the atmosphere of the baking step comprises oxygen. In embodiments, the atmosphere is an ambient atmosphere. In embodiments, the presence of oxygen may advantageously facilitate calcination of the ligands. In addition to the baking, an annealing step may be performed after the baking. The annealing step may advantageously yield a crystalline solid electrolyte.

In particular embodiments, the sol-gel precursor solution comprises (i) a matrix precursor capable of forming a gel in presence of the voltage, (ii) a template material for guiding the formation of the gel (and more in particular, for guiding the formation of a porous matrix in the gel), and (iii) an electrolyte compound: in these particular embodiments, the solid electrolyte coating that is formed is a composite electrolyte comprising a porous matrix and an electrolyte present therein.

In embodiments, the sol-gel precursor solution may comprise from 5 to 30 wt %, preferably from 10 to 20 wt % of matrix precursor.

In embodiments, the sol-gel precursor solution may comprise from 15 to 60 wt %, preferably from 20 to 40 wt % of template material.

In embodiments, the sol-gel precursor solution may comprise 5 to 25 wt %, preferably from 7 to 13 wt % of electrolyte compound.

In embodiments, the sol-gel precursor solution may comprise 0 to 73 wt % of solvent, preferably 22 to 73 wt % of solvent, more preferably from 35 to 65 wt % of solvent. The solvent preferably comprises from 0 to 45 vol %, preferably from 35 to 40 vol % of water and from 55 to 80 vol %, preferably from 60 to 75 vol % of an alcohol.

The matrix precursor is a material that is capable of forming a gel in the presence of the voltage, such as a material capable of e.g. a polymerization or polycondensation reaction. In embodiments, the matrix precursor comprises (i) one or more precursors to the sol-gel formation of an oxide of silicon, aluminium, zirconium, titanium, or a combination thereof, or (ii) one or more precursor to the sol-gel formation of a phosphate. In preferred embodiments, the matrix precursor comprises one or more precursors to the sol-gel formation of an oxide of silicon, preferably tetraethyl orthosilicate, tetramethylorthosilicate or tetrapropylorthosilicate. In embodiments, the matrix precursor comprises $X(OR)_4$ wherein each R is an alkyl group selected independently, preferably amongst $C_{1-3}$ alkyl groups, $R'X(OR)_3$ wherein each R, and R', are alkyl groups selected independently, preferably amongst $C_{1-3}$ alkyl groups, $ZX(OR)_3$, wherein Z is a functional group such as carbonate, dicyanamide, bis(oxalato)borate, chloro-, cyano-, nitro-, amine- and amide-, and wherein each R is an alkyl group selected independently, preferably amongst $C_{1-3}$ alkyl groups, wherein X may be selected from Si, Ti, Zr, and Al, for instance (3-aminopropyl)triethoxysilane, methyltriethoxysilane, CI—R-TMOS; $NH_2$-R-TMOS, titanium-isoporopoxide, $TiCl_4$, or Zr(IV) ethoxide.

The electrolyte compound may comprise any salt i.e. comprising an anion and a cation. In embodiments, the electrolyte compound comprises a metal salt, the metal salt comprising a metal cation selected from $Li^+$, $Na^+$, $K^+$, $Ca^{2+}$, $Mg^{2+}$, and $Al^{3+}$, and an anion selected from $ClO_4^-$ (perchlorate), $BE_4^-$ (tetrafluoroborate), $PF_6^-$ (hexafluorophosphate), bistriflimide, bis(trifluoromethylsulfonyl)imide, bis(fluorosulfonyl)imide, bis-(perfluoroethylsulfonyl)imide, and BOB (bis(oxalate)borate). The metal cation may be also be selected from Triflate (trifluoromethaneslfonate), BETI (bis (perfluoroethanesulfonyl)imide), DFOB (difluoro(oxalato) borateBison), PDI (dicyano-pentafluoroethyl-imidazole), TDI (dicyano-trifluoromethyl-imidazole), DMSI (cyclo-difluoromethane-1,1-bis(sulfonyl)imide, HPSI (cyclo-hexafluoropropane-1,1-bis(sulfonyl)imide), DFOD (difluoro(oxalato)borate), BFMB (bis(fluoromalonato)borate), BISON (tatracyanoboarate), and DCTA (dicyanotriazolate). In preferred embodiments, the metal cation is $Li^+$.

In embodiments, the template material guides the formation of the gel, so that the gel that is formed from the sol-gel reaction comprises a porous matrix, for instance a matrix comprising a plurality of interconnected pores (see for instance Chen, et al., Adv. Energy Mater. 8 (2018) 1702675). In embodiments, the template material covers the inner surfaces of the porous matrix, and the electrolyte compound covers the template material.

In embodiments, the template material comprises a material selected from an ionic liquid, a polymer, a polymerized ionic liquid and a surfactant, and combinations thereof. In embodiments, the template material may comprise at least one ionic liquid, or a mixture of ionic liquids, such as at least two, or at least three ionic liquids, wherein the template material possibly also comprises the polymer and/or the surfactant. The ionic liquid may comprise a cation selected from 1-pentyl-1-methyl pyrrolidinium, 1-butyl-1-methyl pyrrolidinium, 1-propyl-1-methyl pyrrolidinium, 1-ethyl-1-methyl pyrrolidinium, 1-butyl-3-methyl imidazolium, 1-ethyl-3-methyl imidazolium, 1,2-dimethyl-3-propyl imidazolium, 1,2-diethyl-3,5-dimethyl imidazolium, trimethyl-n-hexyl ammonium, N-butyl-N-methyl pyrrolidinium, N-methyl-N-propyl piperidinium, and N-ethyl-N-methyl morpholidinium, and of an anion selected from $ClO_4^-$, $BE_4^-$, $PF_6^-$, $BH_4^-$, $PO_4^{3-}$, $Cl^-$, $Br^-$, $I^-$, $NO_3^-$, dicyanamide, thiocyanide, bistriflimide, bis(fluorosulfonyl)imide, bis(trifluoromethanesulfonyl)imide, bis(pentafluoroethylsulfonyl) imide bis-(perfluoroethylsulfonyl)imide, trifluoromethanesulfonyl)acetamide, and bis(oxolato)borate. In embodiments, the polymerized ionic liquid may be obtained from the polymerization of a derivative of one or more of the cations described above, said derivative comprising a polymerizable group such as for instance a vinyl or an allyl group. Such a derivative can for instance be formed by removing to adjacent hydrogens from an alkyl group, thereby forming an alkene group such as a vinyl group or an allyl group.

In preferred embodiments wherein the template material is an ionic liquid and wherein the electrolyte compound is a metal salt, the ionic liquid and the metal salt comprise the same anion.

The polymer may comprise a polyether such as polyethylene oxide having a molecular weight of from 2,000 to 200,000 g/mol, and/or a copolymer derived from one of the following polymers: a polyether, preferably ethylene oxide or propylene oxide, a poly(methyl methacrylate), and a polyvinylidene fluoride.

In embodiments, the surfactant may be a polymer electrolyte. In embodiments, the surfactant may conduct lithium ions. In embodiments, the surfactant may dissolve Li ions. In embodiments, the surfactant may comprise hexadecyl (trimethyl)ammonium bromide or other surfactants with different alkyl chain lengths, functional groups or counterions. In embodiments, the surfactant may comprise a PEO-PPO block copolymer and in particular a poloxamer such as Pluronic® F127, P123 or F107 wherein PEO is polyethylene oxide and PPO is polypropylene oxide. In embodiments, the surfactant may comprise an amphiphilic block copolymer such as oligomeric alkyl poly (ethylene oxide) (Brij®, Tergitol™), alkyl-phenol poly(ethylene oxide) (Triton™) or sorbitan esters (Tween®, Span®). In embodiments, the surfactant may comprise a functionalized PEO. In preferred embodiments, the sol-gel precursor solution may comprise: from 5-25 wt % electrolyte, such as lithium salt e.g. Li TFSI; 25-50 wt-% template material, such as ionic liquid e.g. EMI TFSI; 0-20 wt-% $H_2O$; 5-20 wt-% matrix precursor e.g. TEOS; 20-50 wt-% of an alcohol e.g. propylene glycol methyl ether; and 0-10 wt-% polymer, surfactant, or additives e.g. Pluronic® F127.

In embodiments, the solid electrolyte coating may be an electrolyzer comprising a porous matrix: in these embodiments, the sol-gel precursor solution comprises a matrix precursor capable of forming a gel in presence of the voltage, and an electrolyzer template material for guiding the formation of a porous matrix in the gel. In embodiments, inner surfaces of the porous matrix comprised in the formed solid electrolyte may be covered by the electrolyzer template material. Advantageously, in embodiments, electrolyzers may be conductive for $OH^-$ and $H_3O^+$ ions, for instance through pores of the porous matrix. In these embodiments, the matrix precursor comprises a precursor to at least one of the following oxides: a titanium oxide, a zirconium oxide, and a magnesium oxide. In these embodiments, the matrix precursor comprises a material comprising hydroxyl conducting group e.g. $Ti(OR)_4$, $Ti(OR)_3X$, or a mixture therefor, in which X is a hydroxyl conducting group. Advantageously, in these embodiments, inner surfaces of the electrolyzer may have improved hydroxyl conduction.

In embodiments, the electrolyzer template material preferably comprises a chemical group that enables a conductivity of $OH^-$ and $H_3O^+$ ions through the electrolyzer, such as through the pores of the porous matrix. In such embodiments, the electrolyzer template material may comprise at least one of the following: cetyl trimethyl ammonium bromide, Pluronic® F127, Pluronic® P123, a quaternary ammonium, a tertiary diamine, a phosphonium cation optionally comprising an alkyl chain, a sulphonium cation possibly comprising an alkyl chain, a metal cation, a phosphate, an amine, a sulfonate, an ionomer, or an ionic liquid.

In embodiments wherein the solid electrolyte coating is the electrolyzer, the sol-gel precursor solution may further comprise a hydroxyl conduction material. Advantageously, in embodiments, after formation of the electrolyzer, the hydroxyl conduction material covers inner surfaces of the porous matrix, and improves the conductivity of $OH^-$ ions through the electrolyzer, such as through the pores of the porous matrix. In embodiments, the hydroxyl conduction material covering inner surfaces of the porous matrix is itself covered by the electrolyzer template material. In embodiments, the hydroxyl conduction material may comprise a Self-Assembled Monolayer (SAM) precursor. In embodiments, the SAM precursor comprises: an anchoring group that binds to an oxide surface, such as —$Si(OR)_3$; an alkyl chain; and an end group that promotes hydroxyl conduction. Examples of end groups that promote hydroxyl conduction are quaternary ammonium, tertiary diamines, phosphonium, sulphonium, and metal cations In embodiments, the SAM precursor covalently binds to inner surfaces of the porous matrix, forming a SAM on the inner surfaces of the porous matrix. In these embodiments, the sol-gel precursor solution may further comprise a swelling agent, for instance comprising 1,3,5-trimethylbenzene, (benz)imidazolium or pyridinium. Advantageously, the swelling agent may enlarge the template. This has the effect of providing larger pores.

In embodiments wherein the solid electrolyte coating is the electrolyzer, the sol-gel precursor solution may further comprise a glass fiber support or a polymer. Advantageously, these materials may improve the mechanical strength of the electrolyzer.

In embodiments of the first aspect of the present invention, the method further comprises the steps of: (a') before step (b), forming a sol-gel precursor solution of a solid electrolyte coating, (a") after step a', aging the sol-gel precursor solution, and wherein step (b) comprises coating the aged sol-gel precursor solution. In embodiments, aging the sol-gel precursor solution comprises allowing the sol-gel precursor to react for from 0 to 14 days, such as from 2 hours to five days. When aging is performed for too long, the sol-gel reaction may occur in the sol-gel precursor solution during the aging, which is unwanted. In embodiments, the pH of the sol-gel precursor solution is preferably from 2 to 7, such as from 3 to 5. To reach the preferred pH, in embodiments, for instance, acid may be added, such as HCl. The preferred period for aging may depend on the pH of the sol-gel precursor, with lower pH corresponding to shorter aging period. For instance, in embodiments, a pH of 5 may correspond to a preferred period for aging of approximately 5 days, whereas a pH of 3 may correspond to a preferred period for aging of 2.5 hours. Without being bound by theory, as the sol-gel precursor solution is acid, the matrix precursor hydrolyses to form a hydrolysed matrix precursor, which, in embodiments, facilitates the sol-gel reaction. Over the duration of the aging step, molecules of the hydrolysed matrix precursor may, to a limited extent, also react with other molecules of the hydrolysed matrix precursor. As a result, the hydrolysed matrix precursor may, during aging, form clusters of matrix precursor, such as nanoclusters i.e. clusters having a diameter below 100 nm. In embodiments, the sol-gel reaction comprises linking of the clusters, thereby forming the gel. In embodiments, aging may comprise heating, microwave treatment or ultrasonic treatment, which may, advantageously, speed up the aging process.

In embodiments, the matrix precursor of the sol-gel precursor solution may comprise a hydrolysed matrix precursor. For instance, the hydrolysed matrix precursor may be prepared separately, or may be received from a commercial source. Advantageously, in these embodiments, the sol-gel reaction may be very fast without requiring an additional aging step.

In embodiments, the sol-gel precursor solution coated in step b further comprises water and optionally an alcohol. The alcohol may advantageously function as a solvent for the other materials of the sol-gel precursor solution, and is in embodiments inert towards the matrix precursor, thereby possibly allowing to further control e.g. the rate of the sol-gel reaction. In embodiments, the alcohol may comprise one or more of the following: 1-methoxy-2-propanol, ethanol, methanol, and isopropyl alcohol. In embodiments wherein the sol-gel precursor solution comprises water, a cathodic voltage that is sufficiently high to reduce the water may be generated across the solution, so that water is reduced to form $OH^-$, and hydrogen gas. The result of this electrochemical reaction is a local pH increase in the area close to the electrode, in particular close to the cathode. In embodiments, the $OH^-$ functions as the catalyst for the sol-gel reaction. In embodiments, the pH increase results in the sol-gel reaction, e.g. the polycondensation, of the matrix precursor, so that the sol-gel reaction will occur on the electrode i.e. cathode surface. In particular embodiments, such as wherein the sol-gel precursor solution has been aged, the sol-gel reaction will be particularly fast. Alternatively, the voltage that is generated may be an anodic voltage that is sufficiently high to, instead, oxidize the water, thereby oxidizing the water, thereby locally reducing the pH close to the electrode, such as the anode. In embodiments, protons may be a catalyst for the sol-gel reaction, so that the sol-gel reaction will occur on the electrode i.e. anode surface. The present invention is however not limited to the sol-gel precursor solution comprising water: in embodiments, the sol-gel precursor solution may or may not comprise any compound able to form a catalyst, such as $OH^-$ and/or $H^+$, but not limited thereto, upon the generation of the voltage. In embodiments, the sol-gel precursor solution may comprise a compound able to form $OH^-$ upon the generation of the voltage. In embodiments, the sol-gel precursor solution may comprise a compound able to form H+upon the generation of the voltage.

Generating the voltage across the sol-gel precursor solution via the first and second electrodes may involve applying a voltage difference between the first and second electrodes, thereby generating the voltage across the sol-gel precursor solution. For this, for instance, the first and second electrodes may be contacted with a voltage source. Alternatively, generating the voltage across the sol-gel precursor solution may involve applying a current from one electrode to the other through the solution, thereby generating the voltage across the sol-gel precursor solution. For this, for instance, the first and second electrodes may be contacted with a current source. It may be advantageous to use a reference electrode, such as an Ag/AgCl reference electrode, a saturated calomel electrode or Hg/HgO reference electrode, with which the voltage that is generated can be compared, i.e. for stabilizing the voltage that is generated across the solution by allowing more accurate determination of the generated voltage between the first and/or the second electrode and the sol-gel precursor solution. In embodiments wherein the voltage is generated by applying a voltage, the addition of the reference electrode may significantly increase accuracy in the generated voltage. In embodiments wherein the voltage is generated by applying a current, the voltage can be accurately measured and used as a parameter for applying the current.

In embodiments according to the first aspect of the present invention, the substrate may be a conductive substrate comprised in the first electrode. In embodiments, the first electrode (e.g. the conductive substrate) is used as a cathode in step (c), and the second electrode is used as an anode in step (c). In embodiments, the conductive substrate comprises at least one of the following: a conductive sheet, such as a planar conductive sheet, and a conductive porous material. The conductive porous material may, for instance, comprise electrode particles, or a metal mesh e.g. an entity comprising spaced structures such as described in WO 2019/016036, of which the content is included here by reference, but the present invention is not limited to these examples. Preferably, the conductive substrate is corrosion-resistant, which may be a feature of the material itself and/or may be induced by for instance a corrosion-resistant layer e.g. carbon or a silicon film present on the material. In embodiments, the corrosion-resistant layer may protect the substrate against corrosion for instance during deposition of the electrolyte. Advantageously, the presence of the corrosion-resistant layer facilitates the integration of the solid electrolyte on the conductive substrate directly into a battery, wherein the corrosion-resistant layer may be necessary to protect the substrate against corrosion e.g. by the electrolyte of the battery during operation of the battery. Corrosion may result in self-discharge of the battery, which is unwanted. In embodiments, the conductive substrate comprises one of the following: aluminium, stainless steel, nickel, platinum, silver, gold, and copper, preferably aluminium or copper. As these materials are frequently used as electrodes, such as current collectors, in batteries, such embodiments facilitate the direct integration of the solid electrolyte coating on the substrate formed by embodiments of the present invention in solid-state batteries.

In preferred embodiments, the conductive substrate comprises copper. The advantage of using copper as the conductive substrate is that it is a highly conductive material. Furthermore, copper is frequently used as the anode in solid-state batteries, as copper does not intercalate in particular lithium at low voltages, that is, copper does not alloy with lithium. Lithium batteries instead comprising electrodes capable of alloying with lithium, may show significant capacity losses over time. Without being bound by theory, such capacity losses may be due to effects resulting from the volume expansion of the electrode, irreversible electrochemical reactions of the electrolyte, or diffusion-controlled trapping of lithium in the electrode. Therefore, using copper for the conductive substrate facilitates the integration of the solid electrolyte coating on the copper substrate formed by embodiments of the present invention directly into solid-state batteries comprising lithium for conduction. In preferred embodiments, the copper substrate has a thickness of from 5 to 50 μm.

In embodiments, the substrate may be a conductive substrate on a conductive support. In embodiments, the substrate may be electrically non-conductive. In embodiments, the substrate may be an electrically non-conductive layer on a conductive support. The non-conductive substrate may comprise any material that does not conduct electrons.

In embodiments, when the substrate is electrically non-conductive, the first and the second electrodes may be stationary with respect to each other and the substrate may be moving relative the first and the second electrode. In such embodiments, the second electrode can for instance be a conductive blade or preferably a conductive slot-die used as an anode. The first electrode can for instance be a cathode in electrical contact with the sol-gel precursor solution coated in step b. In this embodiment, a gel is formed at the cathode when step c is performed. By moving the substrate with respect to both stationary electrodes while the gel is forming, the gel is continuously formed on the substrate.

When the substrate is comprised in the first electrode and is conductive, coating the first electrode with the sol-gel precursor solution involves applying the sol-gel precursor solution to the surface of the first electrode so that the sol-gel precursor covers e.g. wets at least part of the surface, and, in certain embodiments, the complete surface, of the first electrode. Thereby, the first electrode physically i.e. electrically contacts the sol-gel precursor solution.

In embodiments, the second electrode can be any type of electrode. In embodiments, electrically contacting the sol-gel precursor solution with the second electrode involves bringing the sol-gel precursor solution in physical contact with the second electrode. Preferably, the second electrode is removable from the gel that is formed after generation of the voltage. The second electrode may comprise a conductive material. The second electrode is preferably electrochemically and chemically inert. In addition, in embodiments, the second electrode may be able to oxidize and/or reduce water. In embodiments, the second electrode may comprise a metal, such as stainless steel, titanium, or platinum.

In embodiments, the second electrode is a conductive blade. The conductive blade is suitable for spreading the sol-gel precursor solution on the substrate when the substrate is moved relatively to the conductive substrate. In embodiments, coating the sol-gel precursor solution on the substrate comprises adding the sol-gel precursor solution to the front of the conductive blade, i.e. at the side of the conductive blade facing the direction in which the conductive blade is moving, before or while the conductive blade is moved over the substrate. In embodiments, the first electrode may be the substrate, e.g. the conductive substrate. However, the first electrode may also, for instance, be an electrode element that is e.g. stationary with respect to the conductive blade, and moves over the e.g. non-conductive substrate at the same speed and in the same direction as the conductive blade. The electrode element may for instance remain at a small distance from the conductive blade, such as between the conductive blade and the substrate. The electrode element may or may not be coupled to the conductive blade. It is further to be appreciated that "moving over" is considered to be relative, e.g. as the conductive blade is moved over the substrate i.e. with respect to the conductive substrate, at the same time the substrate is moved with respect to the conductive blade. This is particularly relevant for instance for a setup for a roll-to-roll process, wherein for instance the conductive blade may be stationary with respect to the setup, but wherein the substrate may be moved with respect to the setup. Preferably, the conductive blade does not contact the substrate, but remains at a certain distance above the substrate, wherein the certain distance is proportional to the preferred thickness of the solid electrolyte coating. As the conductive blade moves forward, the sol-gel precursor solution coats and/or impregnates the substrate. In embodiments, the conductive blade is continuously in contact with the sol-gel precursor solution as it moves over the substrate.

Next, the voltage can be generated via the conductive blade and the first electrode, across the sol-gel precursor solution. Without being bound by theory, catalyst is thereby formed in that region, which catalyses the sol-gel reaction of the sol-gel precursor solution, so that the gel is substantially instantaneously formed in the region between the conductive blade and the first electrode e.g. the conductive substrate. Hence, as the conductive blade is moved over the substrate, the gel is formed on the surface of the first electrode, such as on top of the conductive substrate.

The distance between the blade and the substrate may be from 0 to 5 cm, preferably from 100 to 2000 μm, more preferably from 100 to 1000 μm. A faster movement of the conductive blade over the substrate would be beneficial for upscaling applications. However, too large speeds may result in an incomplete formation of the gel. In embodiments, the speed of the conductive blade is from 0 to 5 m/s.

In embodiments, in addition to the conductive blade, an additional blade can be used. The additional blade may e.g. be a non-conductive blade which initially spreads the sol-gel precursor solution to coat the substrate e.g. as in a conventional blade coater: afterward, the conductive blade moves over the sol-gel precursor, thereby generating a voltage across the sol-gel precursor solution. The additional blade may also be an additional conductive blade, which generates a different voltage across the solution than the conductive blade. This may be beneficial in particular when the substrate is the conductive substrate and comprises e.g. particles, possibly conductive particles.

In different embodiments according to the first aspect of the present invention, the second electrode is instead a conductive slot-die. In embodiments, in this alternative method, coating the sol-gel precursor solution on the substrate comprises depositing the sol-gel precursor solution on the substrate by the conductive slot-die as it is moved across the substrate. As the conductive slot-die is moved over the substrate, the sol-gel precursor solution coats and/or impregnates the substrate. In embodiments, the conductive slot-die is continuously in contact with the sol-gel precursor solution. Next, the voltage difference can be generated via the conductive slot-die and the first electrode e.g. the conductive substrate or the electrode element, across the sol-gel precursor solution, thereby transforming the sol-gel precursor solution into a gel.

In embodiments wherein the reference electrode is used, the reference electrode can be added to or comprised in the conductive blade or the conductive slot-die, thereby, in embodiments, touching the precursor liquid as the conductive blade or the conductive slot-die moves over the substrate.

The voltage that is generated via the first and the second electrode across the solution in step (c) should be suitable to transform the sol-gel precursor solution into the gel. In embodiments, this means that the magnitude of the voltage should suffice to generate the catalyst. For instance, in embodiments wherein the sol-gel precursor solution comprises water, the magnitude of the voltage could be such that water is reduced. However, in different embodiments wherein the sol-gel precursor solution comprises water, the magnitude of the voltage could be such that water is oxidized.

The magnitude of the voltage that needs to be generated via the first and the second electrode across the solution in step (c) i.e. in order to transform the sol-gel precursor solution into a gel, depends, in particular, on the composition of the sol-gel precursor solution. In embodiments, the magnitude also depends on what catalyst is preferably formed. For instance, if water is preferably reduced to form $OH^-$, a negative voltage should be generated. In other embodiments, if water is preferably oxidized to form $H^+$, a positive voltage should be generated. In order to determine the magnitude of the voltage, and moreover in order to assess the compatibility of a certain sol-gel precursor solution with the electrodes, such as with the conductive substrate, an electrochemical analysis may be first performed. This may, for instance, be done by placing the electrodes in the sol-gel precursor solution, wherein the first electrode e.g. the conductive substrate is the working electrode, and performing a cyclic voltammetry experiment. The cyclic voltammetry experiment may indicate which voltage needs to be generated to transform the sol-gel precursor solution into a gel, i.e. it may for instance indicate which cathodic voltages need to be generated to reduce the water, or alternatively, which anodic voltages need to be generated to oxidize the water. Thereby it is assessed what voltage needs to be generated in step (c) of the method according to the first aspect of the present invention.

In embodiments, before step c, the voltage suitable for forming the gel in step c may be determined by performing a cyclic voltammetry experiment by placing the first electrode e.g. the conductive substrate in the sol-gel precursor solution, wherein the first electrode is the working electrode.

In addition, the cyclic voltammetry experiment may indicate in which voltage regions any material used in the method undesirably decomposes, e.g. when any of a matrix precursor, template material or electrolyte compound possibly present in the sol-gel solution decomposes. Indeed, if a material decomposes electrochemically, it is expected to see this in the electrochemical analysis. Hence it can be assessed what voltage region must be avoided when performing step (c) on the chosen combination of a sol-gel precursor solution with a certain first electrode. Any changes to the contents of the sol-gel precursor, or any side-reactions, during the formation of the gel, can be assessed by this cyclic voltammetry experiment.

In embodiments, the voltage is chosen so as to obtain a current density of from $-0.5$ mA/cm$^2$ to $-500$ mA/cm$^2$, such as approximately $-1$ mA/cm$^2$. In embodiments, the voltage chosen to do this will be from $-0.1$ V to $-10$ V, but, as mentioned before, is advantageously determined for each different combination of materials.

In embodiments, the gel comprises the reaction product of the sol-gel reaction. In embodiments, the gel may comprise the inorganic solid electrolyte. In embodiments, the gel comprises the product of the sol-gel reaction of the matrix precursor, such as an oxide of silicon, aluminium, zirconium, titanium, or a combination thereof, or a phosphate. In embodiments, the gel comprises the porous matrix i.e. the matrix comprising a plurality of interconnected pores. In embodiments, the plurality of interconnected pores comprises the template material, wherein the template material preferably covers inner surfaces of the porous matrix. In embodiments, the pores comprise an electrolyte. In embodiments, the pores comprise the electrolyte compound, wherein the electrolyte compound preferably covers inner surfaces of the porous matrix. In embodiments, the pores comprise the electrolyte compound and the template material, wherein the template material preferably covers inner surfaces of the porous matrix, and wherein the electrolyte compound preferably covers the template material.

In embodiments, the gel may be washed to remove any remaining sol-gel precursor solution. Such a washing step helps to control the gel thickness. For instance, the gel on the substrate may be submerged in a liquid. The liquid may comprise water or an organic solvent such as an alcohol. Preferably, the solvent removes the remaining sol-gel precursor solution, while any lithium salt present in the gel is not removed. To avoid the dissolution of the lithium salt in the washing liquid, the washing liquid may be saturated with the lithium salt. Alternatively, the solvent may be a solvent in which the sol-gel precursor solution dissolves and wherein the lithium salt substantially does not dissolve.

In intermittent embodiments wherein the second electrode is either a conductive blade or a conductive slot-die, step b may comprise b1) applying the sol-gel precursor solution of the solid electrolyte coating on the substrate and b2) moving the substrate relatively to the second electrode, wherein step b1 and b2 are performed continuously while step c is performed intermittently, and wherein the method further comprises a step c' after step c of washing the gel. Washing the gel may advantageously remove any remaining sol-gel precursor solution, which is particularly advantageous since sections of the coating have not been gelified. In intermittent embodiments wherein the method comprises step d of drying or baking the gel, step c' is comprised in the method before step d. In intermittent embodiments wherein the second electrode is a conductive slot-die, step b may comprise b1) applying the sol-gel precursor solution of the solid electrolyte coating on the substrate and b2) moving the substrate relatively to the second electrode, wherein step b1 is performed intermittently while step b2 is performed continuously and wherein the method further comprises a step c' after step c of washing the gel. The intermittent embodiments are advantageous in cases where the formation of a plurality of spaced-apart coatings of defined length are desired. In such cases, using the intermittent coating instead of cutting the continuous coating can increase processing efficiency and decrease cost by wasting less precursor. For instance, this facilitates the formation of stacked cells.

In embodiments, the gel comprises a solvent, such as water and/or ethanol. Drying or baking the gel may involve allowing the gel to dry over time. In embodiments, the gel may be dried at room temperature; in different embodiments, drying the gel comprises heating the gel. Preferably, the temperature of the drying is from 20° C. to 150° C. Drying the gel may involve applying a vacuum to the gel. In some embodiments, the drying takes from 1 hour to 4 days. Drying the gel may partially or substantially remove the solvent, and possibly any other volatile compounds such as unreacted matrix precursor, comprised in the gel. By properly controlling the drying, a solid water layer i.e. an ice layer may be retained in the pores of the gel, affecting e.g. improving the conductivity of the solid electrolyte coating formed from the gel (Chen, X. et al. Science Advances, 6 (2020) eaav3400). Drying the gel on the substrate yields the solid electrolyte coating on the substrate.

The solid electrolyte coating is a coating comprising a solid electrolyte. In embodiments, the solid electrolyte is a solid material comprising an electrolyte. In embodiments, the solid electrolyte may be a solid material with an ion mobility, such as a high ion mobility, for instance an ion mobility of at least $10^{-4}$ S/cm for instance at 25° C. In embodiments, the solid electrolyte has a low electrical conductivity, such as a negligible electronic conductivity. In embodiments, the thickness of the solid electrolyte coating may be from 100 nanometer to 100 micrometer, preferably from 1 to 50 micrometer, preferably from 5 to 20 micrometer.

In embodiments, the solid electrolyte coating may be a coating comprising a composite electrolyte. In embodiments, the solid electrolyte coating may comprise the inorganic solid electrolyte. In embodiments, the composite electrolyte comprises a porous material i.e. a porous matrix having a plurality of pores. The porous matrix may comprise any material formed from the matrix precursor, such as an oxide of silicon, aluminium, zirconium, magnesium, titanium, or a combination thereof, or a phosphate. Preferably, the porous matrix comprises an oxide of silicon. The porous matrix may be a nanoporous matrix i.e. wherein the diameter of the pores is on average 100 nanometers or smaller, preferably a mesoporous matrix i.e. containing pores with an average diameter of from 2 to 50 nm. In embodiments, the template material and the electrolyte compound cover inner surfaces of the pores. The plurality of pores may be interconnected, thereby allowing the movement of ions through the pores e.g. from one side of the porous material to the other side of the porous material.

The composite electrolyte may have an ion mobility, such as a high ion mobility, preferably an ion mobility of at least $10^{-4}$ S/cm, more preferably an ion mobility of at least $10^{-2}$ S/cm, the ion mobility referring to the mobility of an ion of the electrolyte compound for instance at 25° C. The ion mobility may be comparable to or higher than the mobility of the ion in the bulk electrolyte, the bulk electrolyte comprising the electrolyte compound not comprised in the composite electrolyte. In embodiments, the electrolyte compound comprised in the pores is a confined solid.

According to a second aspect, the present invention relates to a process for forming a composite electrode, the process comprising performing a method according to the first aspect of this invention, wherein the substrate is a conductive substrate and comprises a porous active electrode material and wherein step (b) results in impregnating the porous active electrode material with the sol-gel precursor solution.

The porous active electrode material may comprise electrode particles comprising the electrode material, wherein the electrode particles are in electrical contact with each other. In these embodiments, the electrode particles may be bonded together with a polymer binder i.e. to physically stabilize the porous active electrode material. Furthermore, in embodiments wherein the porous active electrode material comprises electrode particles, a conductive additive such as carbon black, graphite, carbon-based fibers, and beads, or stainless steel fiber may be comprised in the pores and in electrical contact with the porous active electrode material, thereby improving the electrical contact between the electrode particles. For instance, the conductive additive comprised in the pores may be 0-10 wt %, preferably 0.1 to 10 wt % of the weight of the porous active electrode material.

In embodiments, impregnating the porous active electrode material comprises filling the pores of the porous active electrode material with the sol-gel precursor solution, thereby coating the porous active electrode material with the sol-gel precursor solution. The sol-gel precursor solution electrically contacts the porous active electrode material i.e. the first electrode. Hence, on generating the voltage, the sol-gel reaction takes place on the surface of the porous active electrode material, thereby forming a gel that coats the porous active electrode material. The thereby formed composite electrode is relatively straightforwardly integrated in a solid-state battery comprising the material as an electrode of the solid-state battery.

In embodiments, the composite electrode is suitable for integration in a solid-state battery wherein it is used as the cathode. In these embodiments, the porous active electrode material may comprise at least one material selected from lithium manganese nickel oxide (LMNO), lithium manganese oxide (LMO), lithium iron phosphate (LFP), lithium manganese iron phosphate (LMFP), Lithium manganese phosphate (LMP), lithium cobalt oxide (LCO), lithium nickel manganese cobalt oxide (NMC), and lithium nickel cobalt aluminum oxide (NCA). In different embodiments, the composite electrode is suitable for integration in a solid-state battery wherein it is used as the anode. In these embodiments, the porous active electrode material may comprise at least one material selected from lithium, graphite, silicon, tin, graphene, and lithium titanium oxide (LTO). In embodiments, the porous active electrode material comprises a composite, comprising for instance: silicon and graphite; or silicon and graphene.

In embodiments, the porous active electrode material covers a second conductive substrate. Impregnating the porous active electrode material with the sol-gel precursor solution may result in electrically contacting the sol-gel precursor solution with the second conductive substrate. In embodiments, the porous active electrode material may be in electrical contact with the second conductive substrate. In these embodiments, generating the voltage via the first electrode i.e. the porous active electrode material, may comprise generating a voltage via the second conductive substrate, thereby generating a voltage via the porous active electrode material. In embodiments, sol-gel precursor solution impregnates the porous active electrode material and in addition is present on top of the porous active electrode material. In this way, an additional layer of solid electrolyte is formed on top of the composite electrode, which is often required in applications of the composite electrode in e.g. solid-state batteries.

In embodiments, the second conductive substrate comprises a metal foil comprising a metal suitable for use as a composite cathode electrode in a solid-state battery, such as aluminium, nickel, or stainless steel. In embodiments, the second conductive substrate comprises a metal foil comprising a metal suitable for use as a composite anode electrode in a solid-state battery, such as copper, nickel, or stainless steel. Preferably, the second conductive substrate may be corrosion-resistant, which may be a feature of the material of the second conductive substrate. Possibly, the second conductive substrate is coated with a protection layer, thereby rendering the second conductive substrate corrosion-resistant.

In embodiments, the second conductive substrate may comprise a metal mesh, e.g. an entity comprising spaced structures such as described in WO 2019/016036, of which the content is included here by reference, comprising a metal suitable for use as a composite anode electrode in a solid-state battery, such as copper, stainless steel, nickel or platinum. The metal mesh may comprise a monolithic three-dimensional structure of interconnected wires comprising pores. The interconnected wires of the metal mesh may be covered with a protective layer for instance to prevent corrosion of the mesh. The metal mesh may have a porosity of from 10% to 90%. In embodiments, the metal mesh comprises pores with a diameter of from 15 nm to 500 nm, preferably from 50 nm to 250 nm. The interconnected wires may have a diameter of from 10 nm to 500 nm, for example from 10 nm to 300 nm, preferably from 15 nm to 200 nm or from 50 nm to 200 nm. In embodiments, the metal nanomesh has a thickness of from 1 micrometer to 1 mm.

A metal mesh coated with the composite electrode can for instance be straightforwardly integrated in a solid-state battery, e.g. wherein the composite electrode is the cathode, and wherein the metal mesh is the anode of the solid-state battery. In embodiments, the composite electrode formed by this method comprises porous active electrode material coated and/or impregnated with solid electrolyte, wherein, in embodiments, the porous active electrode material is bonded together with polymers, and wherein, in embodiments, carbon black is in electrical contact with the porous active electrode material. In embodiments, the composite electrode comprises the second conductive substrate, wherein the porous active electrode material coated and/or impregnated with solid electrolyte covers the second conductive substrate. In different embodiments, the composite electrode comprises the metal mesh, wherein the porous active electrode material coated with solid electrolyte covers the metal mesh.

According to a third aspect, the present invention relates to a method for forming a solid-state battery comprising the steps of (i) forming a composite cathode electrode by a process according to the second aspect of the present invention, (ii) forming a solid electrolyte coating on a substrate by a method according to the first aspect of this invention, and (iii) physically contacting the solid electrolyte material of the composite cathode electrode formed in step (i) with the solid electrolyte coating present on the conductive substrate formed in step (ii).

In embodiments, the substrate of step (ii) may be a conductive substrate. Physically contacting the solid electrolyte material of the composite cathode electrode formed in step (i) with the solid electrolyte coating present on the substrate formed in step (ii) comprises electrically contacting the solid electrolyte material of the composite cathode electrode formed in step (i) with the solid electrolyte coating present on the substrate formed in step (ii). In embodiments, the composite cathode electrode from step (i) has a different composition, such as a different silica to ionic liquid ratio, different lithium salt type, or different amount or type of ionic liquid, than the solid electrolyte coating formed in step (ii).

The porous active electrode of the composite cathode electrode of step (i) may comprise any material mentioned with regards to the second aspect, wherein the material is suitable for forming a composite electrode that is suitable for integration in a solid-state battery wherein it is used as the cathode. In embodiments, the composite cathode electrode of step (i) is coated on the second conductive substrate, the second conductive substrate comprising a material suitable for being used as a cathode in solid-state batteries, such as aluminium. In embodiments wherein the substrate of step (ii) is a conductive substrate, the substrate of step (ii) comprises a material suitable for being used as an anode in solid-state batteries, such as copper. In embodiments, the conductive substrate of step (i) has the same or a different composition than the conductive substrate of step (ii).

In particular embodiments, drying of the gel to form the solid electrolyte material on the conductive substrate of step (i) and drying of the gel to form the solid electrolyte coating of the composite cathode electrode of step (ii) is not performed or is performed for a duration of 1 to 5 s. In embodiments, the drying may be at room temperature. In embodiments, the method comprises a step (iv) after step (iii) of (further) drying and/or (further) baking the physically contacted solid electrolyte material and solid electrolyte coating. The (further) drying and/or (further) baking of step (iv) is preferably at a temperature of from 20° C. to 150° C. The (further) drying and/or (further) baking of step (iv) may involve applying a vacuum. In embodiments, in addition to an eventual drying and/or baking in step (i) and (ii), a (further) drying and/or (further) baking in step (iv) may result in a better electrical contact between the solid electrolyte material and solid electrolyte coating.

In embodiments, the solid-state battery formed by this method comprises the composite cathode electrode in physical contact with the solid electrolyte coating on the conductive substrate.

The invention will now be described by a detailed description of several embodiments of the invention. It is clear that other embodiments of the invention can be configured according to the knowledge of persons skilled in the art without departing from the true spirit or technical teaching of the invention, the invention being limited only by the terms of the appended claims.

EXAMPLES

Conductive Blade-Coating

In a series of examples according to embodiments of the present invention, a solid electrolyte coating, more particularly a coating comprising a composite electrolyte, is formed. For this, first, a sol-gel precursor solution is prepared. Next, three examples are given of forming the solid electrolyte coating from this sol-gel precursor solution.

Preparation of a Sol-Gel Precursor Solution

First, a sol-gel precursor solution was prepared. For this, 1.02 ml of the ionic liquid 1-butyl-1-methylpyrrolidinium bis(trifluoromethylsulfonyl) imide (BMP-TFSI, Solvionic nv, >98.5%), utilized here as the template material, and 0.33 g of the electrolyte compound lithium bis(trifluoromethylsulfonyl)imide (Li-TFSI, ABCR Solvay pure, 99.95%) were mixed in a glass vial in an argon-filled glovebox (0.1 ppm $H_2O$, 0.1 ppm $O_2$). Next, the vial was taken out of the glovebox and 0.5 ml of deionized $H_2O$ was added after which the solution was gently shaken. Finally, 0.5 ml of the matrix pre-cursor tetraethyl orthosilicate (Sigma-Aldrich, 99.0%) and 1 ml of the alcohol 1-methoxy-2-propanol (PGME, Sigma-Aldrich, 99.95%) were added. The vials were then sealed and stored in a climate chamber (SH-641, ESPEC Corp.) with the temperature and RH % set at 25° C. and 50%, respectively, for aging of the sol-gel precursor solution. The sol-gel precursor solution was left to age for approximately 48 hours.

To determine the voltage to be applied in step (c) of the method according to the first aspect of the present invention, the sol-gel precursor solution was analyzed by electrochemical analysis, more specifically by a cyclic voltammetry experiment. In that way, we want to determine at which voltage the water of the sol-gel precursor solution is reduced to form $OH^-$.

For this electrochemical analysis, which serves to test the sol-gel precursor solution in a controlled manner, use was made of a 3-electrode setup, comprising: an Ag/AgCl reference electrode; a Ti gauze counter electrode (60 mesh, 0.2 mm dia wire); and a TiN wafer substrate (silicon wafer with 15 nm of Ti deposited by CAD and 150 nm of TiN CAD deposition) as the working electrode. An electrode cell was used made of Teflon 3, wherein the exposed surface area of the TiN wafer substrate was 0.785 $cm^2$.

The electrochemical experiments were performed using an Autolab pgstat30 potentiostat controlled by Nova software. Two samples of the sol-gel precursor solution were investigated, wherein a first sample was aged for 10 minutes and a second sample was aged for 96 hours. The results of the electrochemical experiments are shown in FIG. 1, which is a plot of the current density Id ($mA/cm^2$) measured through the sample as a function of the applied voltage V, i.e. which is referenced to the Ag/AgCl reference electrode. The arrows indicate the direction in which the potential is tuned such as scanned, i.e. corresponding to the potential sweep. In FIG. 1, the onset potential of the reduction of water is indicated for each of the samples, i.e. −1.5 V for the 10 minutes aged sol-gel precursor solution (dashed curve) and −1.7 V for the 96 hours aged sol-gel precursor solution (full line), the water reduction current is observed corresponding to the band at that voltage i.e. potential. Without being bound by theory, the onset potential corresponds approximately to what can be expected based on theory i.e. 1V vs. Ag/AgCl: it is slightly lower than the theoretical value due to the material of the electrode used. Also, the absolute current density keeps increasing with reducing the applied voltage, which further confirms that the band corresponds to water reduction. In addition, no side-reactions are observed, i.e. which would show up as additional positive or negative current. The person skilled in the art will be able to analyze results from an electrochemical experiment, such as from cyclic voltammetry, thereby being able to determine at what potential i.e. voltage water is reduced, and whether additional side-reactions take place in the sol-gel precursor solution.

Example 1

Coating of the Aged Sol-Gel Precursor Solution on a Conductive Substrate Using a Conductive Blade In a first example, the electroblading experiments were performed making use of a copper foil substrate (25 μm thick) as the conductive substrate. In addition, use was made of a modified blade coater setup (MTI Corporation, MSK-AFA-II): a conductive blade was connected as the counter electrode of a potentiostat, and the conductive substrate are connected to the working and reference electrode connectors of the potentiostat, the potentiostat being an Autolab PGSTAT30 potentiostat with the Nova software.

The distance between the conductive blade and the conductive substrate was set to 1 mm. Around 1 ml of the 48 hours aged sol-gel precursor solution was deposited on the conductive substrate, which was enough to cover the front of the blade. The conductive blade was moved at a speed of 6.5 mm/s over the conductive substrate, while the applied voltage between the blade and the conductive substrate was varied from −3.2 V to −3.5 V. Thereby, the aged sol-gel precursor solution was transformed into a gel.

Figure 2:
FIG. 2 is a SEM image of a solid electrolyte on a conductive substrate, formed according to an embodiment of a method of the present invention, wherein one of the electrodes is a conductive blade.

Next, the conductive substrate coated with the gel was washed by dipping in de-ionized water twice. Advantageously, in embodiments, the conductive substrate coated with the gel is not washed, as lithium salt in the gel may dissolve in the water. The gel was dried at room temperature followed by drying in a desiccator i.e. in a dry atmosphere at 45° C. at reduced pressure for 2 days. Finally, the samples were placed in a vacuum oven at room temperature for 1 day to allow the vacuum to remove all remaining water, thereby forming the solid electrolyte, which is a composite electrolyte, on the conductive substrate. SEM analysis was performed on the solid electrolyte coating on the conductive substrate using a Philips XL-30. FIG. 2 shows one of the SEM images, wherein it can be observed that there is 95.8 μm of composite electrolyte coating 18.1 μm of copper substrate.

Example 2

Figure 3:
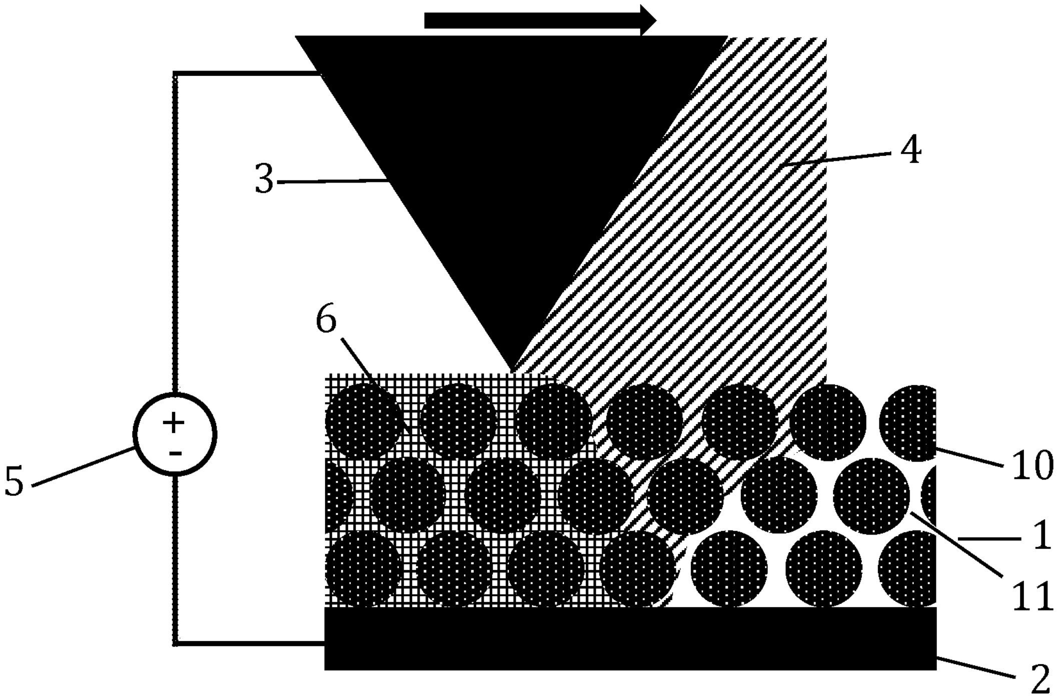
FIG. 3 is a schematic drawing of a conductive blade for coating a conductive substrate with a sol-gel precursor solution according to an embodiment of a method of the present invention.

Coating of the Aged Sol-Gel Precursor Solution on a Conductive Substrate Using a Conductive Blade Reference is now made to FIG. 3. In a second example, the conductive substrate comprises a porous active electrode material 1 comprising a plurality of particles 10, which covers a second conductive substrate 2. The porous active electrode material 1 and the conductive substrate 2, which are in electrical contact with each other, are used in this example as the cathode, and a conductive blade 3 is used in this example as the anode, wherein the cathode and anode are connected with a voltage source 5.

The aged sol-gel precursor solution 4 is added to the front of the conductive blade 3 as the conductive blade is moved over the porous active electrode material 1 covering the second conductive substrate 2. As the conductive blade 3 moves forward i.e. in the direction indicated by the arrow, the pores 11 between the particles 10 are filled with the sol-gel precursor solution 4, so that the porous active electrode material 1 gets impregnated by the sol-gel precursor solution 4. The voltage is continuously generated across the sol-gel precursor solution by the voltage source 5, thereby causing the electrochemical sol-gel reaction on the particles 10 of the porous active electrode material 1, thereby transforming the sol-gel precursor solution 4 in a gel 6.

Example 3

Figure 4:
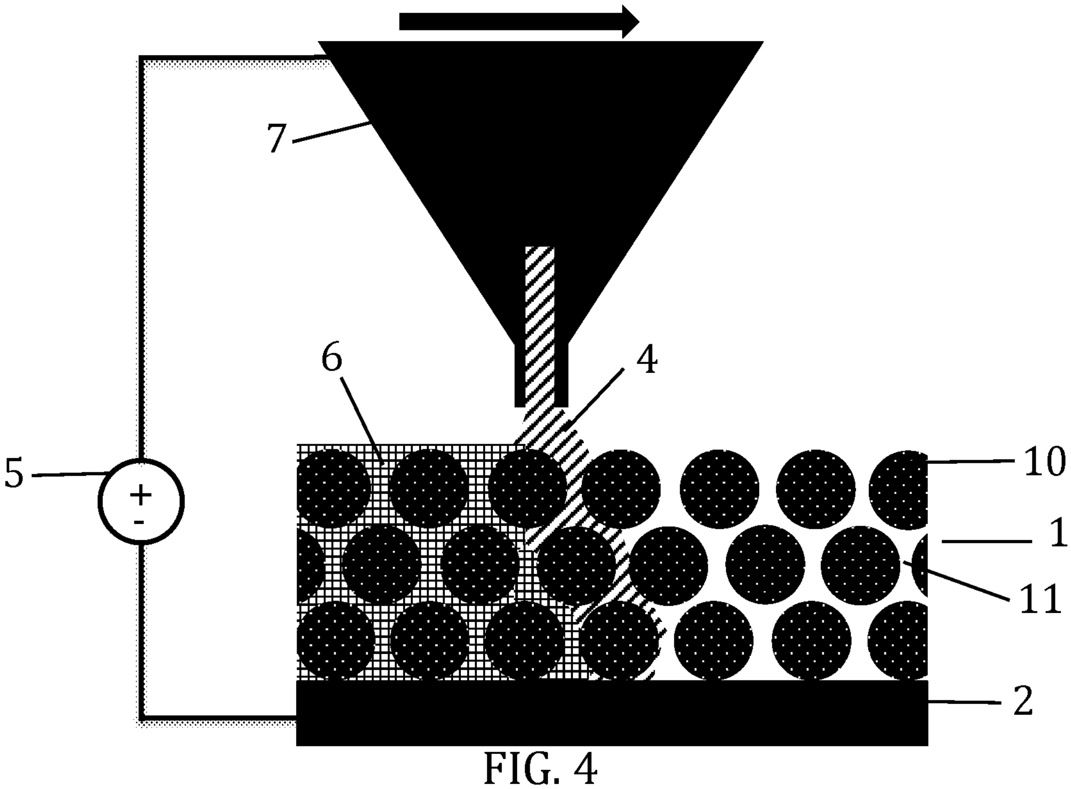
FIG. 4 is a schematic drawing of a conductive slot-die for coating a conductive substrate with a sol-gel precursor solution according to an embodiment of a method of the present invention.

Coating of the Aged Sol-Gel Precursor Solution on a Conductive Substrate Using a Conductive Slot-Die Reference is now made to FIG. 4. In a third example, as in the second example, the conductive substrate comprises a porous active electrode material 1 comprising a plurality of particles 10, which covers a second conductive substrate 2. The porous active electrode material 1 and the conductive substrate 2, which are in electrical contact with each other, are also used in this example as the cathode, but this time, a conductive slot-die 7 is used in this example as the anode, wherein the cathode and anode are connected with a voltage source The aged sol-gel precursor solution 4 is added by the conductive slot-die 7 as it is moved across the porous active electrode material 1 covering the second conductive substrate 2. As the conductive slot-die 7 moves forward in the direction indicated by the arrow, the pores 11 between the particles 10 are filled with the sol-gel precursor solution 4, so that the porous active electrode material 1 is impregnated by the sol-gel precursor solution 4. The voltage is continuously generated across the solution by the voltage source 5, thereby causing the electrochemical sol-gel reaction on the particles 10 of the porous active electrode material 1, thereby transforming the sol-gel precursor solution 4 in a gel 6.

Example 4

Roll-to-Roll Production for the Formation of a Solid-State Battery

Figure 5:
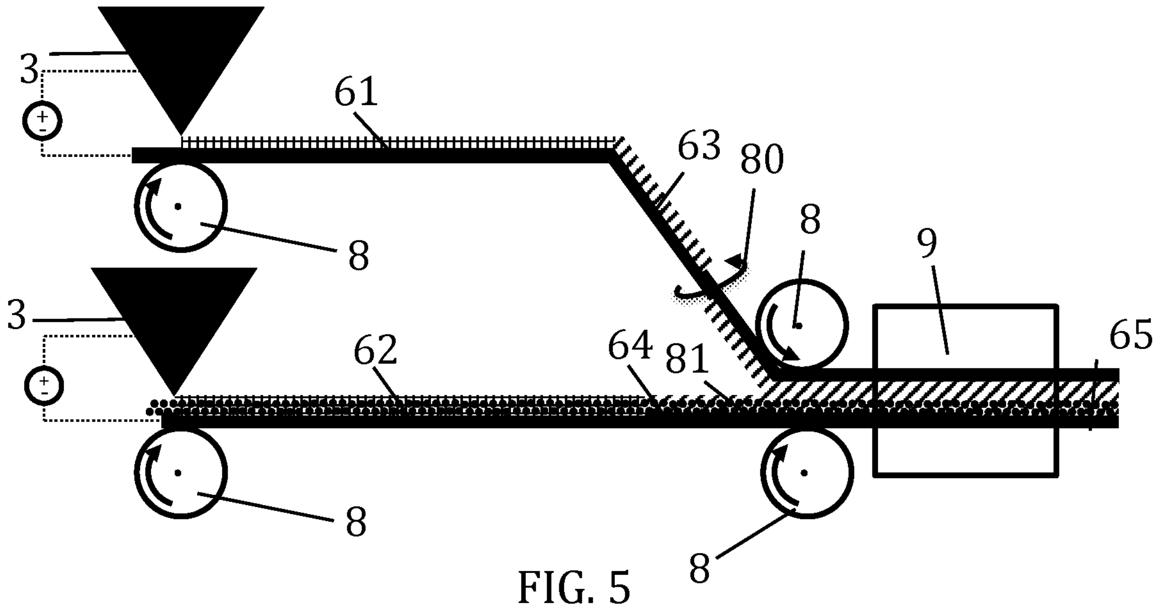
FIG. 5 is a schematic drawing of a roll-to-roll process to produce a solid-state battery according to an embodiment of a method of the present invention.

Reference is now made to FIG. 5, where an embodiment of the method of the third aspect is schematically shown. A gel is formed on a conductive substrate 61, and on the application of an optional (e.g. very short) drying step, a solid electrolyte coating on the conductive substrate 63 is formed, according to an embodiment of the first aspect of the present invention. In addition, a gel is formed coating a conductive substrate i.e. porous active electrode material, on a second conductive substrate 62, and on the application of an optional (e.g. very short) drying step, a composite cathode electrode 64 is formed, according to an embodiment of the second aspect of the present invention. In the roll-to-roll process schematically depicted, the coated conductive substrates 61 and 62 are moved continuously by rotating rolls 8, thereby enabling the continuous formation of the coated conductive substrates 61 and 62. In this example, the solid electrolyte coating on the conductive substrate 63 is first turned 80, and then physically contacted 81 with the solid electrolyte material of the composite cathode electrode 64. It is obvious for the person skilled in the art that the number of turns is irrelevant for the present invention. For instance, by changing the setup of the roll-to-roll process, also no turns may be present in the process, or that at least two, such as three, or a plurality of turns may be present in the process. Next, the physically contacted solid electrolyte coating and solid electrolyte material are moved into an oven 9 for a further drying step comprising e.g. heating, thereby improving the physical contact, i.e. the electrical contact, thereby forming a solid-state battery 65. In embodiments, the roll-to-roll process schematically depicted enables the continuous formation of the solid-state battery 65.

Example 5

A Solid Electrolyte Coating on Both Sides of a Conductive Substrate

Figure 6:
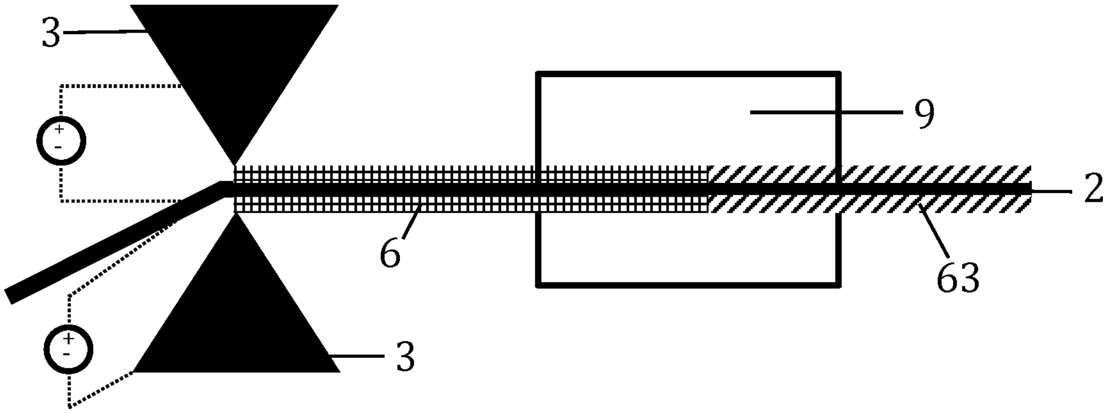
FIG. 6 is a schematic drawing of a roll-to-roll process for producing a solid electrolyte coating on both sides of a conductive substrate according to an embodiment of a method of the present invention.

Reference is now made to FIG. 6. A conductive substrate 2 is on both sides coated by the sol-gel precursor solution (not shown) for instance by deposition by a pair of conductive slot-dies or deposition of the sol-gel precursor solution in contact with a conductive blade 3, or a combination of both. As the voltage is continuously generated over the sol-gel precursor solution, the gel 6 is instantaneously formed, which advantageously allows to also form the gel 6 on the bottom of the conductive substrate 2. The conductive substrate, which is on both sides covered by the gel 6, is moved through an oven 9 for heating the gel 6, thereby forming the solid electrolyte coating 63. The result of this process is a conductive substrate 2 that is on both sides coated with the solid electrolyte coating 63.

Example 6

Intermittent Roll-to-Roll Process

The previous examples comprise roll-to-roll processes wherein a continuous solid electrolyte coating and continuous composite cathode electrode are formed on the conductive substrate. In different embodiments, an intermittent process is possible, thereby forming an intermittent battery material, such as an intermittent solid electrolyte coating, an intermittent composite cathode electrode, or an intermittent solid-state electrode. For instance, this can be achieved by cyclically coating and not coating a sol-gel precursor solution on the conductive substrate. In embodiments, the intermittent battery material facilitates further processing such as cutting of the intermittent battery material.

Figure 7:
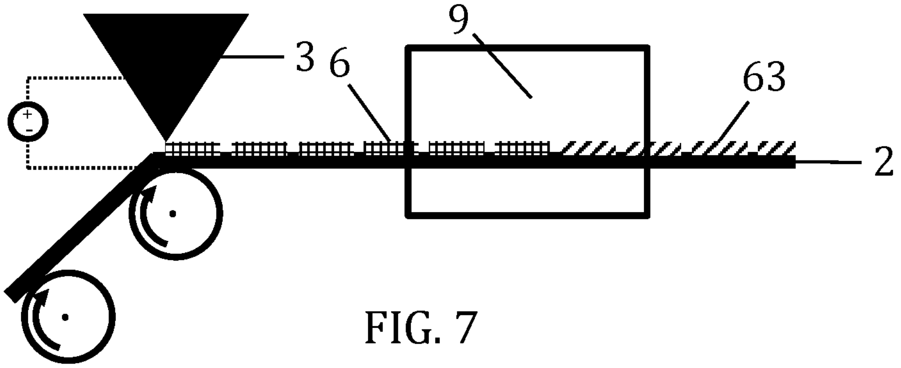
FIG. 7 is a schematic drawing of an intermittent roll-to-roll process for producing an intermittent solid electrolyte coating on top of a conductive substrate.

Reference is now made to FIG. 7. In this example, a sol-gel precursor solution may be continuously coated on the conductive substrate 2. By for instance cyclically turning on and turning off the voltage that is generated between the conductive blade 3 and the conductive substrate 2, an intermittent gel 6 is formed. Any remaining sol-gel precursor solution may be washed off from the conductive substrate by a washing step (not shown) after formation of the gel 9. This washing step is preferably performed before entering of the gel 6 into the oven 9. After heating of the gel 6 into the oven 9, the intermittent solid electrolyte coating 63 is formed on the conductive substrate 2.

Example 7

Figure 8:
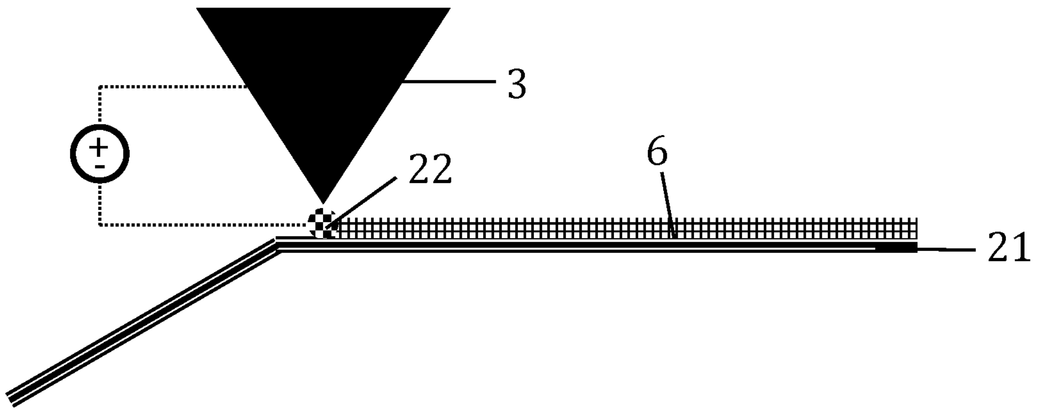
FIG. 8 is a schematic drawing of a roll-to-roll process for producing a gel on a non-conductive substrate.

Roll-to-Roll Process For Coating of a Gel on a Non-Conductive Substrate Using a Stationary Cathode Reference is now made to FIG. 8. A non-conducting i.e. electrically insulating substrate 21 is coated with a sol-gel precursor solution (not shown). A stationary cathode element 22, i.e. stationary with respect to e.g. a conductive slot-die or a conductive blade 3 that is here used as the anode, and the conductive slot-die or conductive blade 3 is in direct contact with the sol-gel precursor solution. By generating a voltage over the sol-gel precursor solution, a catalyst e.g. $OH^-$ is formed on the surface of the stationary cathode element 22. The electrically insulating substrate 21 with the sol-gel precursor solution comprising the catalyst are subsequently moved away from the stationary cathode element 22, and the gel 6 is subsequently formed on top of the electrically insulating substrate 21. By continuously moving the electrically insulating substrate 21, the gel 6 is continuously formed on the surface of the electrically insulating substrate 21, thereby forming a continuous gel 6. From the gel 6, subsequently a solid electrolyte coating can be formed, for instance by a heating step.

The gel 6 may also be formed on the stationary cathode element 22, which may reduce electrical contact between the stationary cathode element 22 and the sol-gel precursor solution. The gel 6 formed on the stationary cathode element 22 is therefore preferably continuously removed. In embodiments, instead of the stationary cathode element 22, a cylindrical cathode element is used, that continuously rotates. The part of the surface of the cylindrical cathode element that is not in contact with the sol-gel precursor solution may advantageously be cleaned, for instance by mechanical means e.g. comprising a sponge, a jet of liquid, or scraping, or chemical means e.g. comprising applying a solution, for instance, comprising HF that dissolves the gel. In that way, any gel formed on the surface of the cylindrical cathode element may then be continuously removed, thereby preventing reduction in electrical contact between the cathode and the sol-gel precursor solution.

It will be obvious to the person in the art, that also an intermittent process can be performed with a similar setup, by e.g. cyclically turning on and turning off the voltage generated across the sol-gel precursor solution.

Example 8

Formation of a Gel on a Conductive Substrate in a Roll-in-Bath Process

Figure 9:
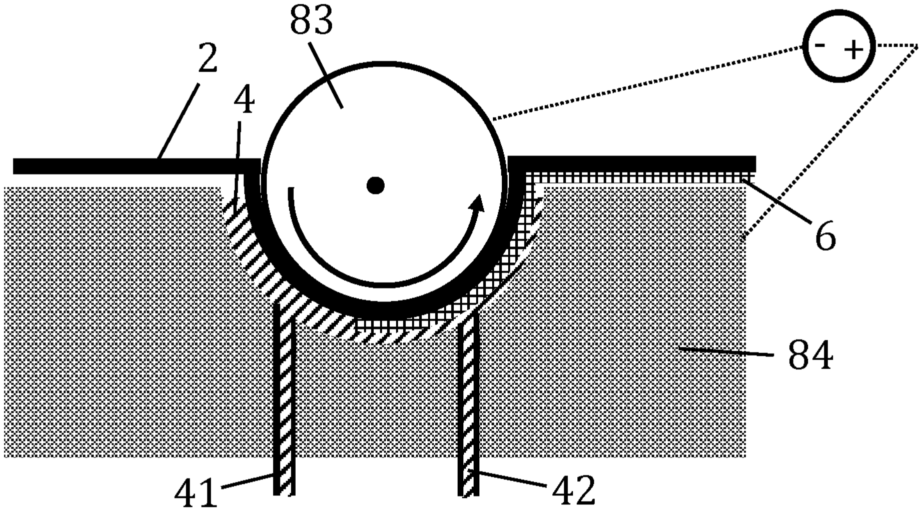
FIG. 9 is a schematic drawing of a roll-in-bath process for producing a gel on a conductive substrate.

Reference is made to FIG. 9. A conductive substrate 2 is moved by a roller 83 through a bath 84 comprising sol-gel precursor solution. A potential is applied to conductive substrate 2 via the roller 83, which may comprise a conductive material or a conductive layer, and which is in electrical contact with the conductive substrate 2, which is a first electrode. The bath 84 comprises a second electrode. By applying a potential across the sol-gel precursor solution via the first and second electrode, gel may be formed on the surface of the conductive substrate 2. Sol-gel precursor solution may be continuously added and removed e.g. via tubes 41 and 42 comprised in the bath 84.

The movement of the conductive substrate 2 through the sol-gel precursor solution 4 can induce agitation, which may be used to control the thickness of the diffusion layer i.e. the layer of sol-gel precursor solution 4 comprising the $OH^-$. The rotation speed of the roller 83 and the flow rate of sol-gel precursor solution through the tubes 41 and 42 and hence the flow rate of the sol-gel precursor solution 4 in the bath, including the flow direction, can thus be important parameters to control the growth (in addition to other parameters such as the potential and the contents of the sol-gel precursor solution). Further addition of a paddle, or a controlled precursor flow, may also induce agitation, thereby further improving controllability of the process of the formation of the gel.

As will be obvious for the person in the art, multiple of such baths may be placed in series, which may allow multiple electrolyte layers to be grown on top of each other. Changing electrochemical parameters, and liquid precursor parameters allows the properties of each layer to be defined as desired. In the case of a non-conductive substrate, this example may, for example, be combined with example 7.

In particular embodiments, wherein electrolytes have sufficient mechanical strength, the gel can be grown directly on top of the roll submerged in the bath, that is, wherein the roll is the conductive substrate. After formation of the solid electrolyte coating on the roll i.e. the conductive substrate, the solid electrolyte coating may be peeled off, to obtain a free-standing solid electrolyte coating.

Note that, although a very specific sol-gel precursor solution was used in the examples above, the contents of the sol-gel precursor solution are by no means limited by these examples.

It is to be understood that although preferred embodiments, specific constructions, and configurations, as well as materials, have been discussed herein for devices according to the present invention, various changes or modifications in form and detail may be made without departing from the scope and spirit of this invention. For example, any formulas given above are merely representative of procedures that may be used. Functionality may be added or deleted from the block diagrams and operations may be interchanged among functional blocks. Steps may be added or deleted to methods described within the scope of the present invention.

The invention claimed is:

1. A method for forming a composite electrode, the method comprising:

providing a first and a second electrode, coating a sol-gel precursor solution of a solid electrolyte coating on a substrate that comprises a porous matrix, thereby impregnating the porous matrix with the sol-gel precursor solution, and electrically contacting the sol-gel precursor solution with the first and the second electrode, the sol-gel precursor solution being capable of forming a gel in presence of a voltage, and generating the voltage across the sol-gel precursor solution via the first and the second electrodes, thereby transforming the sol-gel precursor solution into a gel.

2. The method of claim 1, wherein the substrate is a conductive substrate comprised in the first electrode.

3. The method of claim 2, wherein the conductive substrate is used as a cathode when the voltage is generated across the sol-gel precursor solution.

4. The method of claim 1, wherein the second electrode is a conductive blade, and wherein electrically contacting the sol-gel precursor solution with the second electrode comprises using the conductive blade to blade coat the sol-gel precursor solution on the substrate, thereby forming the coating thereon.

5. The method of claim 4, wherein generating the voltage across the sol-gel precursor solution comprises intermittently generating the voltage across the sol-gel precursor solution, and wherein coating the sol-gel precursor solution of the solid electrolyte coating on the substrate and electrically contacting the sol-gel precursor solution with the first and the second electrode comprises, continuously while intermittently generating the voltage across the sol-gel precursor solution:

applying the sol-gel precursor solution of the solid electrolyte coating on the substrate, and moving the substrate relatively to the second electrode, and wherein the method further comprises, subsequent to intermittently generating the voltage across the sol-gel precursor solution, washing the gel.

6. The method of claim 1, wherein the second electrode is a conductive slot-die, and wherein electrically contacting the sol-gel solution with the second electrode comprises using the conductive slot-die to apply the sol-gel precursor solution on the substrate, thereby forming the coating thereon.

7. The method of to claim 6, wherein coating the sol-gel precursor solution of the solid electrolyte coating on the substrate and electrically contacting the sol-gel precursor solution with the first and the second electrode comprises:

intermittently applying the sol-gel precursor solution of the solid electrolyte coating on the substrate, and while intermittently applying the sol-gel precursor solution of the solid electrolyte coating on the substrate, continuously moving the substrate relatively to the second electrode, and wherein the method further comprises, subsequent to intermittently generating the voltage across the sol-gel precursor solution, washing the gel.

8. The method of claim 1, wherein the solid electrolyte coating is a composite electrolyte comprising a porous matrix and an electrolyte present therein, and wherein the sol-gel precursor solution comprises (i) a matrix precursor capable of forming a gel in presence of the voltage, (ii) a template material for guiding the formation of the gel, and (iii) an electrolyte compound.

9. The method of to claim 8, wherein the electrolyte compound comprises a metal salt, the metal salt comprising:

a metal cation selected from $Li^+$, $Na^+$, $K^+$, $Ca^{2+}$, $Mg^{2+}$, and $Al^{3+}$, and an anion selected from $ClO_4^-$, $BF_4^-$, $PF_6^-$, bistriflimide, bis(trifluoromethylsulfonyl) imide, bis(fluorosulfonyl)imide, bis-(perfluoroethylsulfonyl)imide, and bis (oxalate) borate.

10. The method of claim 8, wherein the template material comprises at least one of an ionic liquid, a polymer, a surfactant, or a polymerized ion liquid.

11. The method of claim 8, wherein the matrix precursor comprises:

one or more precursors to the sol-gel formation of an oxide of silicon, aluminium, zirconium, titanium, or a combination thereof, or one or more precursor to the sol-gel formation of a phosphate.

12. The method of claim 1, further comprising:

before coating the sol-gel precursor solution of the solid electrolyte coating on the substrate and electrically contacting the sol-gel precursor solution with the first and the second electrode, forming a sol-gel precursor solution of a solid electrolyte coating, and subsequently aging the sol-gel precursor solution, wherein coating the sol-gel precursor solution of the solid electrolyte coating on the substrate and electrically contacting the sol-gel precursor solution with the first and the second electrode comprises coating the aged sol-gel precursor solution.

13. The method of claim 1, further comprising drying or baking the gel.

14. A process for forming a solid electrolyte coating on a conductive substrate, the process comprising:

providing a first and a second electrode, wherein the second electrode is a conductive slot-die or a conductive blade, coating a sol-gel precursor solution of the solid electrolyte coating on the conductive substrate that is comprised in the first electrode and electrically contacting the sol-gel precursor solution with the first and the second electrode, the sol-gel precursor solution being capable of forming a gel in presence of a voltage, wherein electrically contacting the sol-gel solution with the second electrode comprises using the conductive slot-die or the conductive blade to apply the sol-gel precursor solution on the substrate, and generating the voltage across the sol-gel precursor solution via the first and the second electrodes, thereby transforming the sol-gel precursor solution into a gel.

15. A method for forming a solid-state battery comprising the steps of:

forming a composite cathode electrode by providing a first and a second electrode, coating a sol-gel precursor solution of a solid electrolyte coating on a conductive substrate that is comprised in the first electrode and electrically contacting the sol-gel precursor solution with the first and the second electrode, the sol-gel precursor solution being capable of forming a gel in presence of a voltage, wherein the conductive substrate comprises a porous active electrode material and wherein coating the sol-gel precursor solution of the solid electrolyte coating on the substrate and electrically contacting the sol-gel precursor solution with the first and the second electrode results in impregnating the porous active electrode material with the sol-gel precursor solution, and generating the voltage across the sol-gel precursor solution via the first and the second electrodes, thereby transforming the sol-gel precursor solution into a gel;

forming a solid electrolyte coating on an additional substrate by:

providing a third and a fourth electrode, coating a sol-gel precursor solution of a solid electrolyte coating on the additional substrate that is conductive and that is comprised in the third electrode and electrically contacting the sol-gel precursor solution with the third and the fourth electrode, the sol-gel precursor solution being capable of forming a gel in presence of a voltage, wherein the additional substrate comprises a porous active electrode material and wherein coating the sol-gel precursor solution of the solid electrolyte coating on the additional substrate and electrically contacting the sol-gel precursor solution with the third and the fourth electrode results in impregnating the porous active electrode material of the additional substrate with the sol-gel precursor solution, and generating the voltage across the sol-gel precursor solution via the third and the fourth electrodes, thereby transforming the sol-gel precursor solution into a gel; and physically contacting the solid electrolyte material of the composite cathode electrode with the solid electrolyte coating present on the additional substrate.

16. The method of claim 15, wherein the conductive substrate is used as a cathode when the voltage is generated across the sol-gel precursor solution.

17. The method of claim 15, wherein the second electrode is a conductive blade, and wherein electrically contacting the sol-gel precursor solution with the second electrode comprises using the conductive blade to blade coat the sol-gel precursor solution on the conductive substrate, thereby forming the coating thereon.

18. The method of claim 17, wherein generating the voltage across the sol-gel precursor solution comprises intermittently generating the voltage across the sol-gel precursor solution, and wherein coating the sol-gel precursor solution of the solid electrolyte coating on the conductive substrate and electrically contacting the sol-gel precursor solution with the first and the second electrode comprises, continuously while intermittently generating the voltage across the sol-gel precursor solution:

applying the sol-gel precursor solution of the solid electrolyte coating on the conductive substrate, and moving the conductive substrate relatively to the second electrode and wherein the method further comprises, subsequent to intermittently generating the voltage across the sol-gel precursor solution, washing the gel.

19. The method of claim 15, wherein the second electrode is a conductive slot-die, and wherein electrically contacting the sol-gel solution with the second electrode comprises using the conductive slot-die to apply the sol-gel precursor solution on the conductive substrate, thereby forming the coating thereon.

20. The method of to claim 19, wherein coating the sol-gel precursor solution of the solid electrolyte coating on the conductive substrate and electrically contacting the sol-gel precursor solution with the first and the second electrode comprises:

intermittently applying the sol-gel precursor solution of the solid electrolyte coating on the conductive substrate, and while intermittently applying the sol-gel precursor solution of the solid electrolyte coating on the conductive substrate, continuously moving the conductive substrate relatively to the second electrode, and wherein the method further comprises, subsequent to intermittently generating the voltage across the sol-gel precursor solution, washing the gel.

* * * * *